United States Patent [19]

Kiang

[11] 4,383,625
[45] May 17, 1983

[54] ADJUSTABLE CONNECTION FOR A BICYCLE REAR CARRIER

[75] Inventor: Nai-Wen Kiang, Schaumburg, Ill.

[73] Assignee: Schwinn Bicycle Company, Chicago, Ill.

[21] Appl. No.: 252,202

[22] Filed: Apr. 8, 1981

[51] Int. Cl.³ ............................................. B62J 7/04
[52] U.S. Cl. .................................... 224/39; 224/30 R
[58] Field of Search ................ 224/30 R, 32 A, 38-41

[56] References Cited

U.S. PATENT DOCUMENTS

| 4,096,980 | 6/1978 | Clow | 224/39 |
| 4,154,382 | 5/1979 | Blackburn | 224/39 |
| 4,239,139 | 12/1980 | Bott | 224/325 X |
| 4,269,335 | 5/1981 | Larose et al. | 224/32 A X |

FOREIGN PATENT DOCUMENTS

| 497163 | 8/1950 | Belgium | 224/30 R |
| 893457 | 10/1953 | Fed. Rep. of Germany | 224/39 |
| W 11606 | 4/1956 | Fed. Rep. of Germany | 224/39 |
| 2524240 | 12/1976 | Fed. Rep. of Germany | 224/39 |
| 563581 | 9/1923 | France | 224/30 R |
| 1090061 | 10/1954 | France | 224/39 |
| 39358 | 10/1936 | Netherlands | 224/32 A |
| 59785 | 2/1912 | Switzerland | 224/41 |
| 235422 | 10/1942 | Switzerland | 224/32 A |
| 2066751 | 7/1981 | United Kingdom | 224/32 A |

Primary Examiner—William T. Dixson, Jr.
Assistant Examiner—Gary E. Elkins
Attorney, Agent, or Firm—McCaleb, Lucas & Brugman

[57] ABSTRACT

A rear carrier or rack for a bicycle has an elongated platform with a pair of side legs attachable to rear frame eyelets. A slide block is supported on the front end portion of the platform and has a pair of spaced, parallel, open sided channels comprising guideways for a pair of slide rods extending beyond the front of the carrier. Lock screws, carried by the rods, extend through open slots in the sides of the slide block and hold the rods at a selected degree of extension beyond the carrier. In one embodiment, a transverse bracket is pivotally connected across downturned front end portions of the slide rods for tilting adjustment about a common horizontal axis. The bracket has a first, central aperture, and a second, offset, elongated aperture. The carrier can be mounted in a plurality of positions to level the platform on bicycles with frame sizes ranging from 19 inches to 27 inches by connecting one or the other of the bracket apertures to the front or rear end of the rear caliper brake mounting bolt. In an alternate embodiment, pivotal clamps are provided on the ends of the slide rods for attachment to bicycle seat stay rods. An optional bracket has a center aperture and two offset apertures.

9 Claims, 16 Drawing Figures

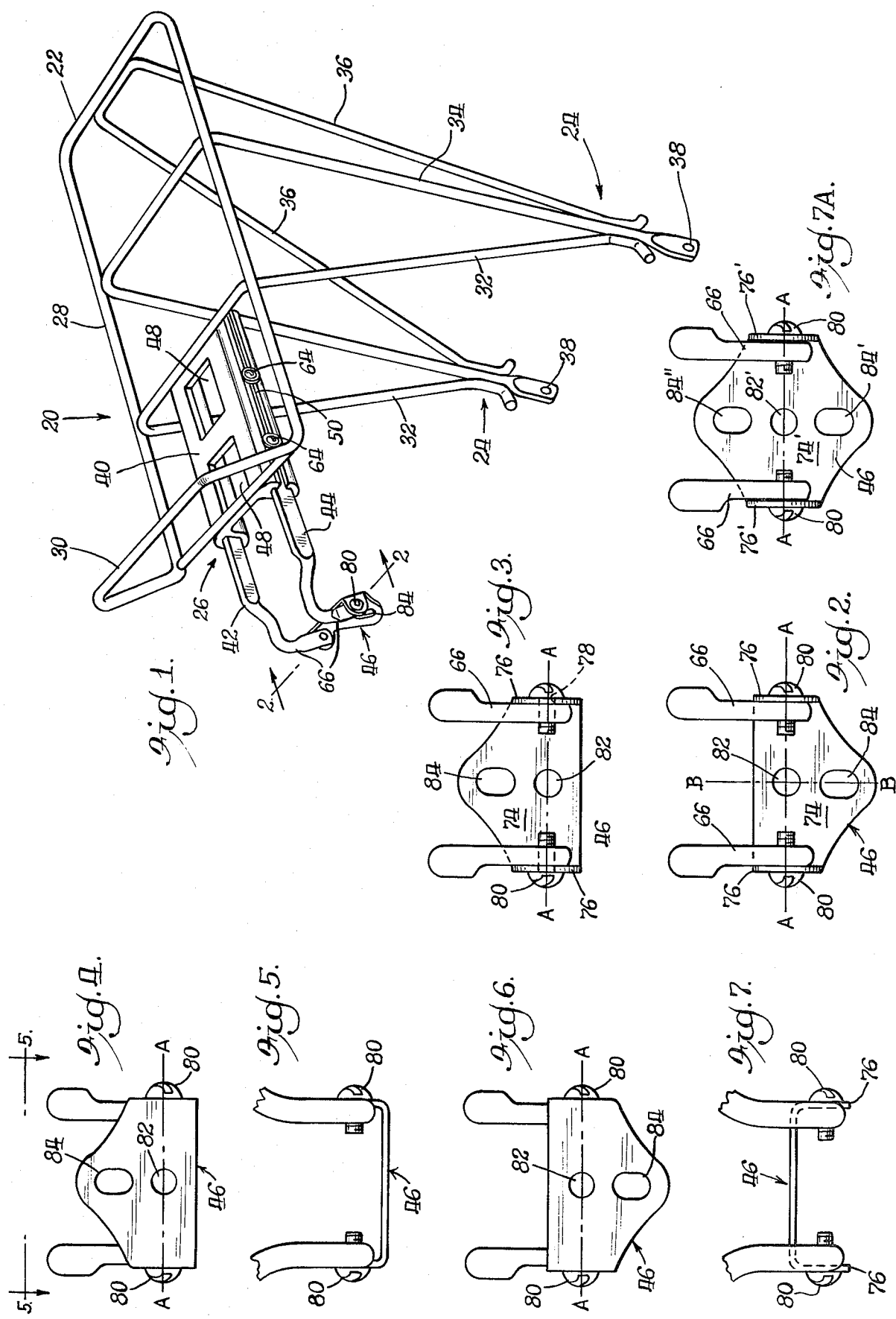

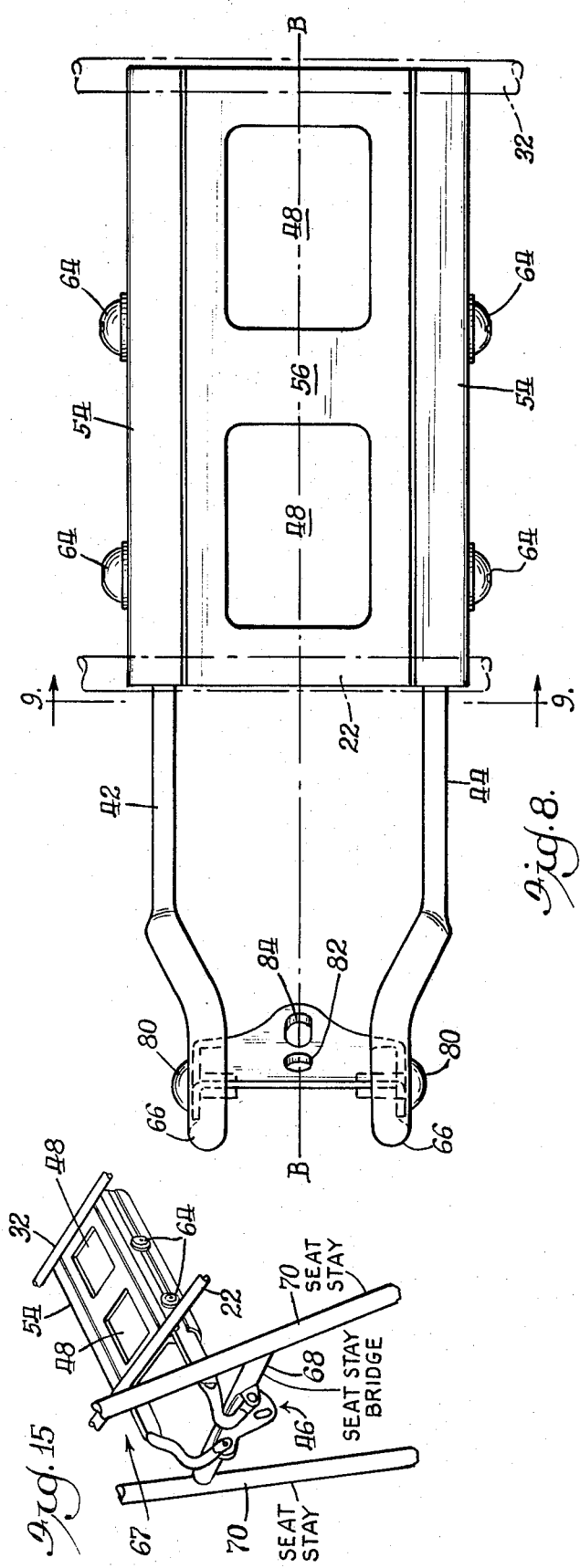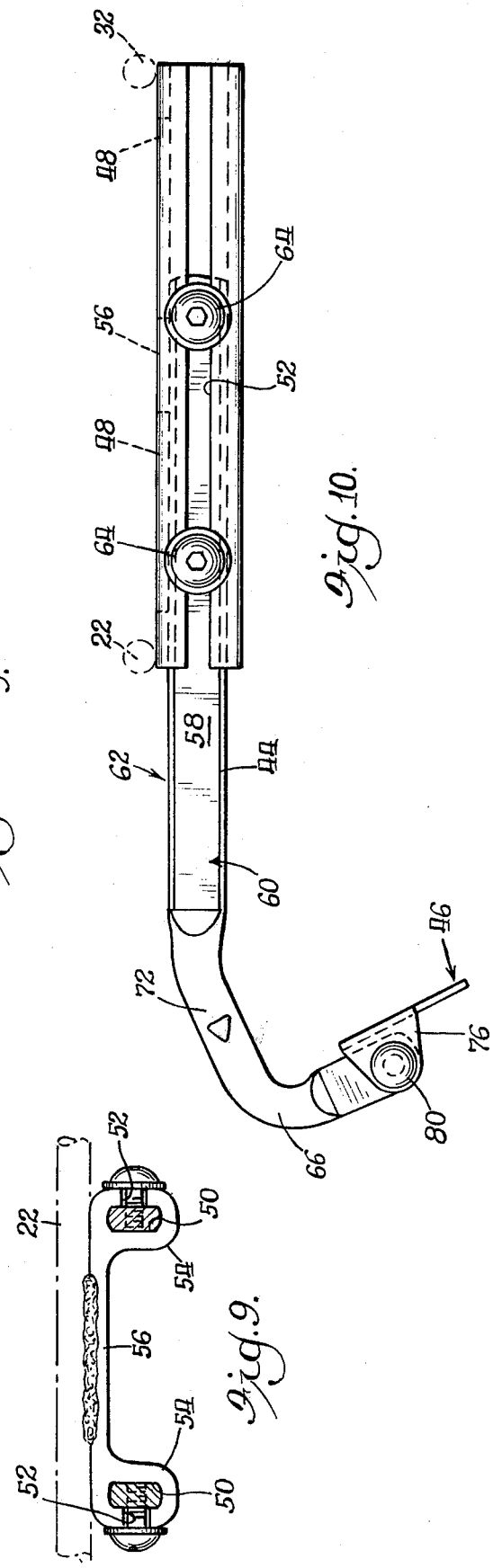

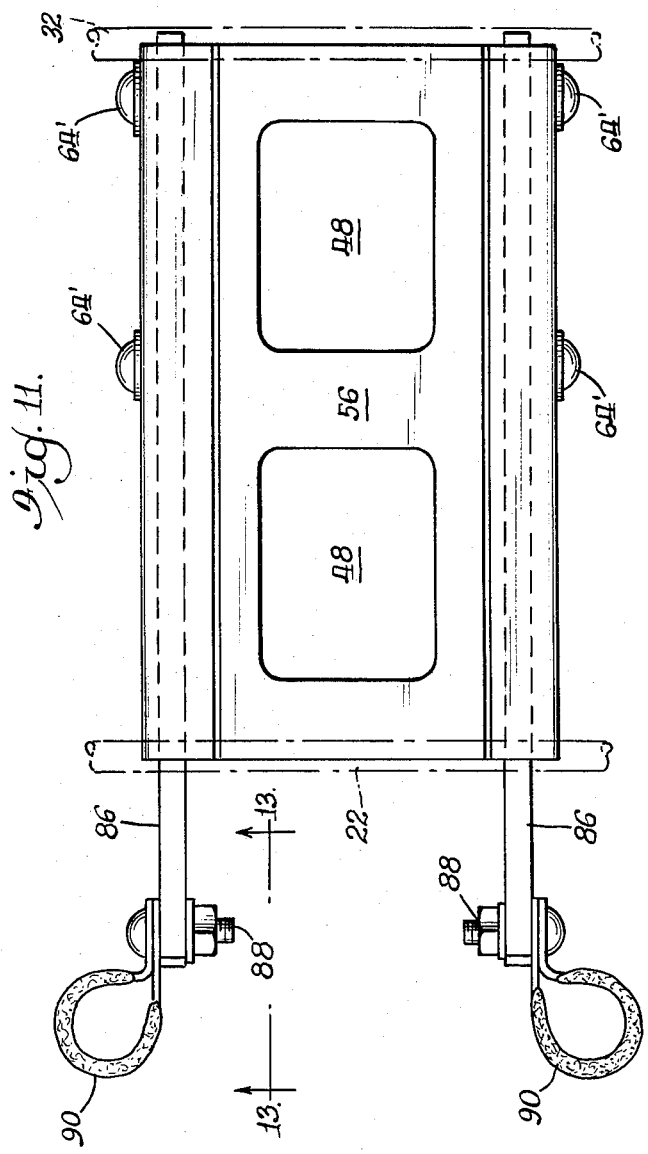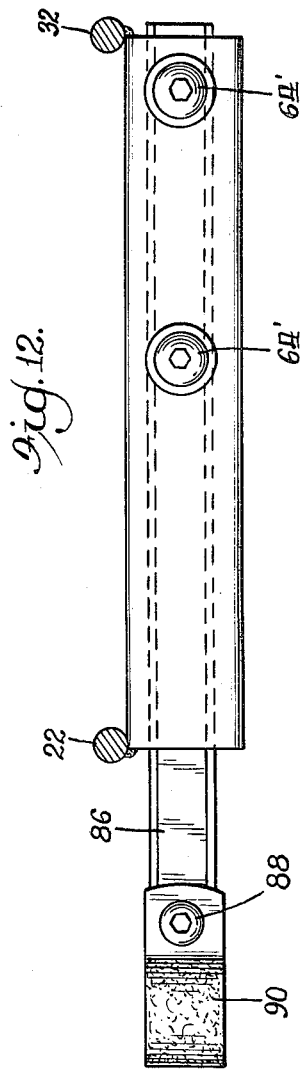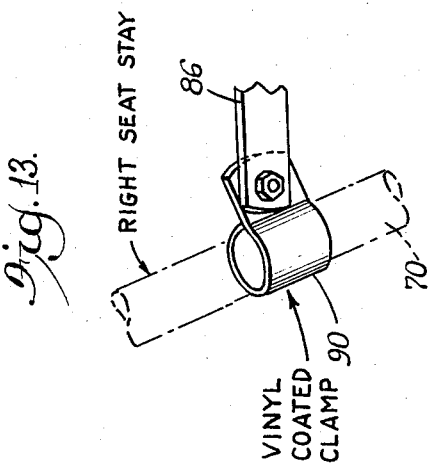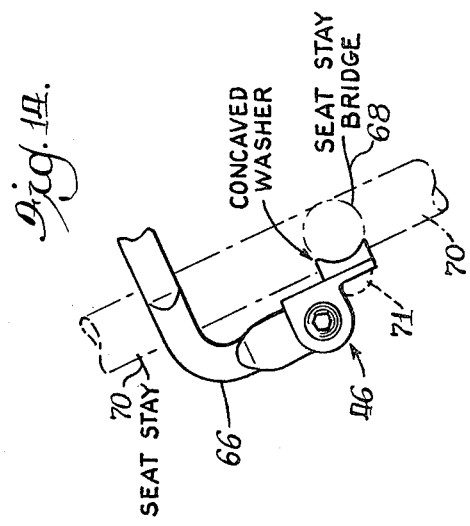

ADJUSTABLE CONNECTION FOR A BICYCLE REAR CARRIER

BACKGROUND OF THE INVENTION

1. Field of the Invention

The field of the invention is generally that of package and article carriers, and more particularly to rear wheel straddling bicycle carriers or racks in Patent and Trademark Office Class 224, Subclass 30R.

Rear carriers are useful accessories for bicycles. The rider's hands remain free for efficient manipulation of the handlebars and the brake and speed change levers while carrying a load in a convenient location behind the seat. Students use rear carriers for books, lunches and gym clothes; commuters carry briefcases; weekend and cross-country sport riders carry food, clothing, camping gear and tools.

2. Description of Prior Art

While bicycles come in many frame sizes, mostly in the range from 19" to 27", strong and lightweight rear carriers have been available only for a single size or a relatively limited range of sizes, such as 19–23", 24–27", or 26–27".

One type of adjustable rear carrier which has been proposed as adjustable for a range of bicycle sizes has a metal strip slidably fitted along the underside of the load platform. The strap has a bolt hole at the forward end which is attachable to some central location at the back of the frame, for instance, on the rear caliper brake mounting bolt. Adjustment of the strap varies its degree of extension forwardly of the platform to level the platform for use on different size bicycles. Examples are shown in Blackburn U.S. Pat. No. 4,154,382; German Pat. No. W 11,606 II/63G; and a rear carrier marketed by Showa Industries, Ltd., Nagoya, Japan identified as their Model RC-103. Among the disadvantages of this extendable metal strap type connection is the inherent frailty of the flexible single strap which allows the strap to vibrate and break after extended service carrying heavy loads over rough streets and roads.

If there were no limits on the size and weight of a bicycle rear carrier, there would be no problem in making it strong enough to last indefinitely. However, modern bicycles are extremely light in weight and the weight of the carrier should be relatively insiginficant by comparision so it will not affect the riding characteristics of the bicycle, especially on those occasions when the carrier is empty. As a practical matter, carriers should not exceed about 1¼ pounds and consequently are made from high strength, light alloys.

Therefore, a problem not adequately met by previously available rear carriers is that of providing a connection for a rear carrier which is adjustable to fit the full size range from 19" to 27" and which, though adjustable, is rigid and strong enough to function without vibration or breakage when carrying heavy loads over rough terrain.

SUMMARY OF THE INVENTION

A general object of this invention is to provide a connection for a bicycle rear carrier, which connection is adjustable to custom fit the carrier to bicycles in the entire range of frame sizes from 19" to 27" with the load supporting platform being level with the ground in each case.

Another object is to provide such an adjustable connection which is rigid and strong and optionally connectable to either the front or back end of the rear caliper brake bolt, or to seat stay rods.

An important feature of the invention is to provide in such an adjustable connection a pair of spaced parallel rods slidably engaged for fore-and-aft movement within guideways in a slide block fastened to the carrier, means connecting the forward end sections of the slide rods to the bicycle frame, and lock screw means for securing the rods at a selected degree of extension beyond the slide block.

Another feature of the invention is to connect the forward end sections of the slide rods with a bracket having central aperture means engageable with the central mounting bolt of a rear caliper brake.

Another feature is that the forward end sections of the slide rods are downturned and are sufficiently close to one another to extend through the space between the bicycle seat stay rods and enable the bracket to be connected to the forward end of the rear caliper brake bolt which commonly extends through a seat stay bridge.

Another feature of the invention is that the bracket is optionally connectable to either end of a rear caliper brake bolt.

Another feature of the invention is that the bracket is optionally assembleable in one of a plurality of positions across the slide rods for engagement with either end of a rear caliper brake bolt, and the bracket has central and offset apertures optionally connectable with the brake bolt.

Another feature of the invention is the provision of pivotal clamps on the front end sections of the slide rods for attachment directly to seat stay rods instead of to a brake bolt.

BRIEF DESCRIPTION OF THE DRAWINGS

FIG. 1 is a perspective view showing a bicycle rack with a connection made in accordance with the present invention;

FIG. 2 is a fragmentary enlarged view of FIG. 1 taken in the direction of arrows 2—2 with a transverse connecting bracket in down position across the back edges of slide rods;

FIG. 3 is a view similar to FIG. 2 showing the bracket in an optional up position across the back edges of the slide rods;

FIG. 4 is a view similar to FIG. 3 showing the bracket in optional up position across the front edges of the slide rods;

FIG. 5 is a top plan view of FIG. 4 as seen in the direction of arrows 5—5;

FIG. 6 is view similar to FIG. 2 showing the bracket in a further optional, down position across the front edges of the slide rods;

FIG. 7 is a top plan view of FIGS. 2, 3 and 4;

FIG. 7A is a view similar to FIG. 2 or 3 showing a modified form of a transverse connecting bracket;

FIG. 8 is a fragmentary enlarged plan view of the connection shown in FIG. 1;

FIG. 9 is a vertical cross-sectional view of FIG. 8 taken along 9—9;

FIG. 10 is a side view of FIG. 8;

FIG. 11 is a view similar to FIG. 8 of a modified form of connection with pivotally adjustable loop-type clamps on the ends of the slide rods for engaging seat stay rods;

FIG. 12 is a side view of FIG. 11;

FIG. 13 is a fragmentary perspective view of FIG. 11 taken in the direction of arrows 13—13 showing one of the clamps connected to a seat stay rod;

FIG. 14 is a view similar to FIG. 13 showing the connecting bracket engaged with the front end of the a rear caliper brake bolt on the forward side of a seat stay bridge; and FIG. 15 is a perspective view of FIG. 14 showing the slide rods extended through the space between seat stay rods above the seat stay bridge.

Like parts are referred to by like reference characters.

DESCRIPTION OF THE PREFERRED EMBODIMENT

Referring now to the specific embodiment of the invention shown in the drawings, a rear bicycle carrier is generally designated 20. It is preferably made of light weight, high strength, aluminum alloy or steel and comprises an elongated platform 22, side legs 24, 24, and an adjustable connection 26 to mount the carrier to a bicycle frame.

The platform 22 comprises a rectangular shaped rod 28 having an upwardly extending front end barrier 30. It is mounted as by welding on three inverted U-shaped supports 32, 34 and 36, the depending portions of which are attached by welding and comprise the aforementioned side legs 24, 24. The legs are pivotally attachable to conventional rear frame eyelets on the bicycle by bolts (not shown) through bolt holes 38, 38 in the center support 34. This cage-like construction is commonly used on bicycle carriers and comprises no part of the present invention so will not be described in further detail.

The invention is the improved adjustable connection 26. It is adjustable to assemble the carrier on a wide range of bicycle frame sizes so that the platform 22 is level with the ground in every case.

The adjustable connection 26 comprises a slide block 40, a pair of slide rods 42, 44, and a transverse connecting bracket 46.

The slide block 40 comprises a flat plate which in mass production may be a cut-off section of an aluminum alloy extrusion having the cross-section shown in FIG. 9. Windows 48 are formed in the plate to eliminate unnecessary weight. As best shown in FIG. 9, spaced, parallel, longitudinally extending guideways 50, 50 comprise flat-sided, oval cross-section channels having side access slots 52. Thus, the slide block includes relatively thick channel portions 54 along the edges connected by an integral central web 56 through which the windows 48 are formed.

The slide rods, 42, 44 are similar to one another, being substantial mirror images. Each has a straight back section 58 with flat side surfaces 60 and curved top and bottom edge surfaces 62 matching the cross-sections of the channels 50 within which these straight back sections are telescopically fitted for slidable movement fore and aft. A pair of lock screws 64 extend through each open side access slot 52 and are threaded into screw holes in each rod. The heads of these lock screws engage the outer side surfaces of slide block channel portions 54 to lock the rods at selected degrees of extension required to level the platform on the particular bicycle involved.

The extreme forward end sections 66 of the slide rods are turned downwardly and backwardly, as best shown in FIGS. 1, 10 and 14. They are joined to the straight back sections 58 by downwardly and inwardly inclined intermediate sections 72, making the forward end sections 66 relatively close together so they can be inserted with the bracket 46 through the space 67 defined by bicycle seat stay rods 70, 70 and seat stay bridge 68 (FIG. 15).

The bracket 46 comprises a sheet or plate with a flat body 74 and a pair of perpendicular ears or tabs 76 at opposite sides. The ears have bolt holes 78. Pivot screws 80 extend through the holes 78 and are screw-threadedly engaged with the slide rod forward end sections 66. Thus, the bracket 46 is pivotally adjustable about horizontal transverse axis A—A through the pivot screws 80.

The bracket 46 has a first, central aperture 82 and a second aperture 84 off-set from it. They are aligned with one another in a central vertical plane B—B (FIGS. 2 and 8) as will be described. Plane B—B contains the axis of the rear caliper brake bolt 71. The central aperture 82 is aligned with the pivot axis A—A as shown in FIGS. 2, 3, 4 and 6.

The bracket 46 can be assembled across the slide rod forward end sections 66 in the four separate positions shown in FIGS. 2, 3, 4 and 6, respectively.

In FIG. 2, the bracket is assembled with the offset aperture 84 in down position, across the rear edges of slide rod forward end sections 66. This same bracket position is shown in FIGS. 1, 8, 10, 14 and 15. By attaching the rear caliper brake bolt to the bracket through one or another of the apertures 82 and 84, and adjusting the extension of the slide rods as required to level the platform 22, this fits small bicycle frame sizes from 19" to 23".

In FIG. 3, the bracket 46 is in a position which is the reverse of FIG. 2. The offset aperture 84 is in up position across the rear edges of slide rod forward end sections 66. This fits large bicycles in frame sizes from 23" to 27".

More specifically, if the central aperture 82 is connected to the front end of the rear caliper brake bolt, in either the down position of FIG. 2 or the up position of FIG. 3, it fits a 23" bicycle frame. If the offset aperture 84 engages the front end of the brake bolt in the down position of FIG. 2, it fits 19–22" bicycle frames; and if the offset aperture 84 engages the same end of the brake bolt in the up position of FIG. 3, it fits 24–27" bicycle frames.

The bracket 46 can be assembled across the front edges of the slide rods to engage the rear end of the rear caliper brake bolt. Such front edge positions are shown in FIGS. 4 to 7. FIG. 4 being a counterpart of FIG. 3 showing the offset aperture 84 in up position, and FIG. 6 being a counterpart of FIG. 2 showing the offset aperture in down position.

An alternate form of bracket 46' is shown in FIG. 7A. It comprises a flat sheet 74' with ears 76' pivotally attached across slide rod end portions 66 by means of screws 80. When bracket 46' is positioned across the forward edges of the slide rod end portions 66 as shown in FIG. 7A, the carrier can be mounted with the platform level on bicycles throughout the entire range of frame sizes from 19–27". Specifically, it will fit a 23" frame if the forward end of the rear caliper brake bolt engages central apertures 82'. It will fit frame sizes from 19" to 22" if the brake bolt engages offset aperture 84'. And it will fit frame sizes from 24" to 27" if the brake bolt engages offset aperture 84". Further, the bracket 46' may be rotated 180° about the position shown in FIG. 7A across the back edges of the rear caliper brake bolt.

For bicycles which do not have rear caliper brakes, or if the operator prefers not to connect the carrier to a brake bolt, he can connect it to the seat stay rods 70 by substituting straight slide rods 86, 86 for slide rods 42, 44. Slide rods 86 are best shown in FIGS. 11, 12 and 13. They are identical, and could be considered equivalents of the straight back sections 58 of slide rods 42, 44. Lock screws 64', similar or identical to screws 64, function in exactly the same way. At the front, on an outside face, each slide rod 86 has a metal, loop-type clamp fastened by a bolt 88. Each can clamp one of the seat stay rods 70 as shown in FIG. 13. The clamps are angularly adjustable about bolts 88 to accommodate the angle of the seat stay rods, or seat stays as they are sometimes called, as also illustrated in FIG. 13.

The above describes but one of many possible specific forms of the invention. Numerous and varied other embodiments can readily be devised in accordance with the principles disclosed by those skilled in the art without departing from the spirit and scope of the invention as defined by the appended claims.

The embodiments in which an exclusive property or privilege is claimed is defined as follows:

1. In an adjustable bicycle rear carrier having an elongated platform with a pair of legs depending from opposite sides of the platform and being pivotally attachable to a bicycle frame adjacent the rear axle;
    an improved adjustable connection, adjustable to assemble the carrier on different size bicycles with the platform over the rear wheel parallel to the ground, comprising:
    a slide block supported on the carrier at the front end portion of the platform and having a pair of separate, spaced, parallel, longitudinally extending, tube-like guideways;
    a pair of slide rods respectively engaged within said guideways for fore-and-aft sliding movement relative to the slide block, each individual guideway substantially completely surrounding the respective slide rod and engaging it snugly along its length;
    lock screw means acting between said slide block and each of said slide rods for securing the latter at a selected degree of extension beyond the slide block; and
    means connecting the slide rods to a bicycle frame member above the rear wheel;
    whereby the carrier can be assembled on a plurality of different size bicycles, with the platform level, by locking the slide rods at selected degrees of extension beyond the slide block.

2. In an adjustable bicycle rear carrier, the combination according to claim 1 in which the transverse spacing of the forward end sections of the slide rods enable them to clear the seat stays of a bicycle whereby they can be extended forwardly past the seat stays to the front side of the seat stay bridge and the forward end sections of the slide rods are interconnected by bracket means and said means connecting the slide rods to a bicycle frame member comprises central aperture means in the bracket means engageable with the front end of a rear caliper brake bolt fastened to the bicycle frame member.

3. In an adjustable bicycle rear carrier, the combination according to claim 2 in which said forward end sections of the slide rods are downwardly inclined to clear the rear caliper brake mechanism and to align the bracket means with the rear caliper brake bolt and the bracket means is pivoted to both slide rods for tilting movement about a common horizontal axis whereby the bracket means may be tilted about said axis to match the angle of the rear caliper brake bolt.

4. In an adjustable bicycle rear carrier, the combination according to claim 3 in which the forward end sections of the slide rods are spaced sufficiently closely together, and the bracket means is sufficiently narrow, to enable said forward end sections of the rods to extend through space between the seat stays when the bracket means engages the front end of the rear caliper brake bolt.

5. In an adjustable bicycle rear carrier, the combination according to claim 4 in which the bracket means is optionally assembleable across the front or rear sides of the downwardly inclined forward end sections of the slide rods and the slide rods have sufficient range of extension relative to the slide block to attach the bracket means to either the front end or the rear end of the rear caliper brake bolt as required to level the platform when the carrier is assembled on bicycles of different sizes.

6. In an adjustable bicycle rear carrier, the combination according to claim 4 in which the central aperture means comprises first and second apertures aligned with one another in a vertical plane containing the axis of the brake bolt, said first aperture being in a transverse plane containing said common horizontal axis, said second aperture being offset from said first aperture, said bracket means being selectively assembleable in a plurality of positions across the downwardly inclined forward end sections of said slide rods, one of said positions enabling the carrier to be assembled on relatively small frame bicycles with the platform level, and another of said positions enabling the carrier to be assembled on relatively large frame bicycles with the platform level.

7. In an adjustable bicycle rear carrier, the combination according to claim 1 in which said means connecting the slide rods to the bicycle frame member comprises individual clamps at the forward end sections of the slide rods, for gripping bicycle left and right hand seat stays respectively.

8. In an adjustable bicycle rear carrier, the combination according to claim 7 in which said clamps are pivotally mounted on said slide rods for tilting movement about horizontal axes to match the angles of the respective seat stays.

9. In an adjustable bicycle rear carrier, the combination according to claim 6 in which the second aperture is elongated in said vertical plane, whereby said carrier fits an intermediate size bicycle frame when said first aperture engages said rear caliper brake bolt, said carrier fits a range of bicycle frame sizes smaller than said intermediate size when said second aperture engages said rear caliper brake bolt in one upright position, and said carrier fits a range of bicycle frame sizes larger than said intermediate size when said second aperture engages said rear caliper brake bolt in an opposite upright position.

* * * * *